June 2, 1970  E. N. SHAWHAN  3,515,988
STREAM ANALYZER FOR OIL-IN-WATER EMULSIONS WITH COMPENSATION
FOR TEMPERATURE CHANGES AND FOR WATER
CONDUCTIVITY CHANGES
Filed Sept. 12, 1968  5 Sheets-Sheet 1

INVENTOR:
ELBERT N. SHAWHAN
BY Donald R. Johnson
ATTY.

TO PROBE 4
VIA MODULE 5 (FIG.2.)

FIG.5.

INVENTOR:
ELBERT N. SHAWHAN
BY Donald R. Johnson
ATTY.

INVENTOR:
ELBERT N. SHAWHAN
BY Donald R. Johnson
ATTY.

United States Patent Office 3,515,988
Patented June 2, 1970

3,515,988
STREAM ANALYZER FOR OIL-IN-WATER EMULSIONS WITH COMPENSATION FOR TEMPERATURE CHANGES AND FOR WATER CONDUCTIVITY CHANGES
Elbert N. Shawhan, West Chester, Pa., assignor to Great Canadian Oil Sands Limited, Toronto, Ontario, Canada, a corporation of Canada
Filed Sept. 12, 1968, Ser. No. 759,358
Int. Cl. G01r 27/26
U.S. Cl. 324—61                                    11 Claims

ABSTRACT OF THE DISCLOSURE

Apparatus utilizing a capacitive probe for continuously measuring the percentage of oil in an oil-in-water emulsion which is flowing in a stream. A reference probe compensates for capacitance changes due to variations in the temperature of the stream. An automatic compensating circuit enables the measurement of capacitance to be made independently of fortuitous and unpredictable changes which may occur in the conductivity of the water in the stream.

---

This invention relates to an analyzing apparatus, and more particularly to an apparatus for measuring the oil concentration in a flowing oil-in-water emulsion.

By way of example, the problem of measuring the oil concentration in an oil-in-water emulsion may arise in a processing scheme for processing oil sand (tar sand), a scheme of this type being disclosed in the copending Thompson et al. application, Ser. No. 760,650, filed Sept. 18, 1968. The process disclosed in such application utilizes a high speed centrifuge wherein a "medium heavy component" liquid (which may be termed "ring dam water") in effect seals the centrifuge; this ring dam water is withdrawn from one of the outlets of the centrifuge, a portion of it being recycled (back into the centrifuge) and the remainder of it being discarded. This ring dam water normally carries about 2% oil; thus, it is an oil-in-water emulsion. When the oil content reaches about 5%, overloading is indicated, and the charge rate to the centrifuge concerned must be reduced to avoid loss of oil. Thus, it is important to be able to measure the oil concentration in this ring dam water. In addition, the efficiency of the overall process can be improved if a constant check is made on the oil content of the "middlings" and "tailings" streams, which are also oil-in-water emulsions.

Measurement of the oil concentration by a laboratory analysis of grab samples is in general not satisfactory because of the infrequent sampling and the necessary delay in reporting of the results, which can and often does permit long periods of improper operation before corrective action is taken.

It has been demonstrated, in laboratory experiments, that the dielectric constant of an oil-water emulsion is linear with concentration, ranging from the dielectric constant of the oil at one extreme to the dielectric constant of water at the other. Size of the drops of oil in water, or water in oil, has a negligible effect on this result. In a water-in-oil emulsion, the high dielectric constant of the water drops makes them appear as conducting spheres immersed in the oil, thus raising the net dielectric constant as the volume they occupy is increased. In an oil-in-water emulsion, the siutation is reversed, the oil drops having the effect of voids in the continuous water phase. The result is not appreciably affected by the nature of the oil, since the dielectric constants of nearly all oils are less than 3, compared with approximately 80 for water.

Measurement of the oil concentration in an oil-in-water emulsion is made difficult by the high conductivity of water (water being the continuous phase), which results in a conducting path in parallel with the capacitance of the capacitor being used to measure the dielectric constant. In the laboratory, the measurement can be made at high frequency, using a bridge which is manually adjusted, with interacting controls for simultaneous conductance and capacitance balance. However, for stream measurement on an automatic, continuous basis, it is not practical to merely automate this laboratory procedure.

An object of this invention is to provide a stream analyzer for oil-in-water emulsions.

Another object is to provide apparatus for automatically measuring the oil concentration in a flowing oil-in-water emulsion.

A further object is to provide a stream analyzer for oil-in-water emulsions which operates to measure the oil concentration substantially independently of changes in the water conductivity.

The dielectric constant of water varies for example from about 88 at 32° F. to about 55 at 212° F. A temperature change of 4° F. causes the same dielectric constant change as a variation of 1% in the oil content. Therefore, compensation is necessary for changes in temperature of the water.

An additional object is to provide a stream analyzer for oil-in-water emulsions having incorporated therein means for compensating for changes in the temperature of the water.

The objects of this invention are accomplished, briefly, in the following manner: Oscillatory energy of two different frequencies is couplied to a capacitive measuring probe inserted in the emulsion flow line, the lower frequency energy being used to maintain a substantially constant shunting resistance in parallel with this measuring probe, and the higher frequency energy being used to sense the impedance of the measuring probe shunted by this constant resistance. The higher frequency energy is also coupled to a reference probe immersed in water free from oil, but responsive to the stream temperature; the measuring circuit indicates the difference between the capacitances of the measuring probe and of the reference probe.

A detailed description of the invention follows, taken in conjunction with the accompanying drawings, wherein.

Speaking generally, the apparatus of this invention is applicable to the measurement of the percentage of oil in any oil-in-water emulsion, or of the percent volume occupied by any low dielectric constant material which is in the form of small, spherical drops suspended in a medium of high dielectric constant which latter may have a conductivity of 2500 micromhos per cubic centimeter, or less.

The stream analyzer of the invention uses oscillations of two different frequencies to measure the dielectric constant of the oil-in-water emulsion independent of changes in the water conductivity. The lower frequency is used to measure the changing resistance between the electrodes of a measuring probe immersed in the stream, and to adjust the resistance of a solid-state resistor (diode), which is connected in parallel with the measuring probe, so as to keep the net shunting resistance (of the parallel combination) constant. The higher frequency is used to measure the capacitance of the measuring probe with this constant resistance shunt. The calibration of measuring probe capacitance against oil content is made with this shunt, so is unaffected by changes in water conductivity (or resistance) over the range covered by the resistance compensating circuit.

In the analyzer of the present invention, compensation for changes in the temperature of the emulsion stream is effected by means of a second probe which is immersed in an enclosed capsule filled with water (free from oil) and which is subjected to the stream temperature; the capacitance measuring circuit indicates the difference between the dielectric constants of the emulsion stream and of the water in the compensating capsule.

Figure 1:
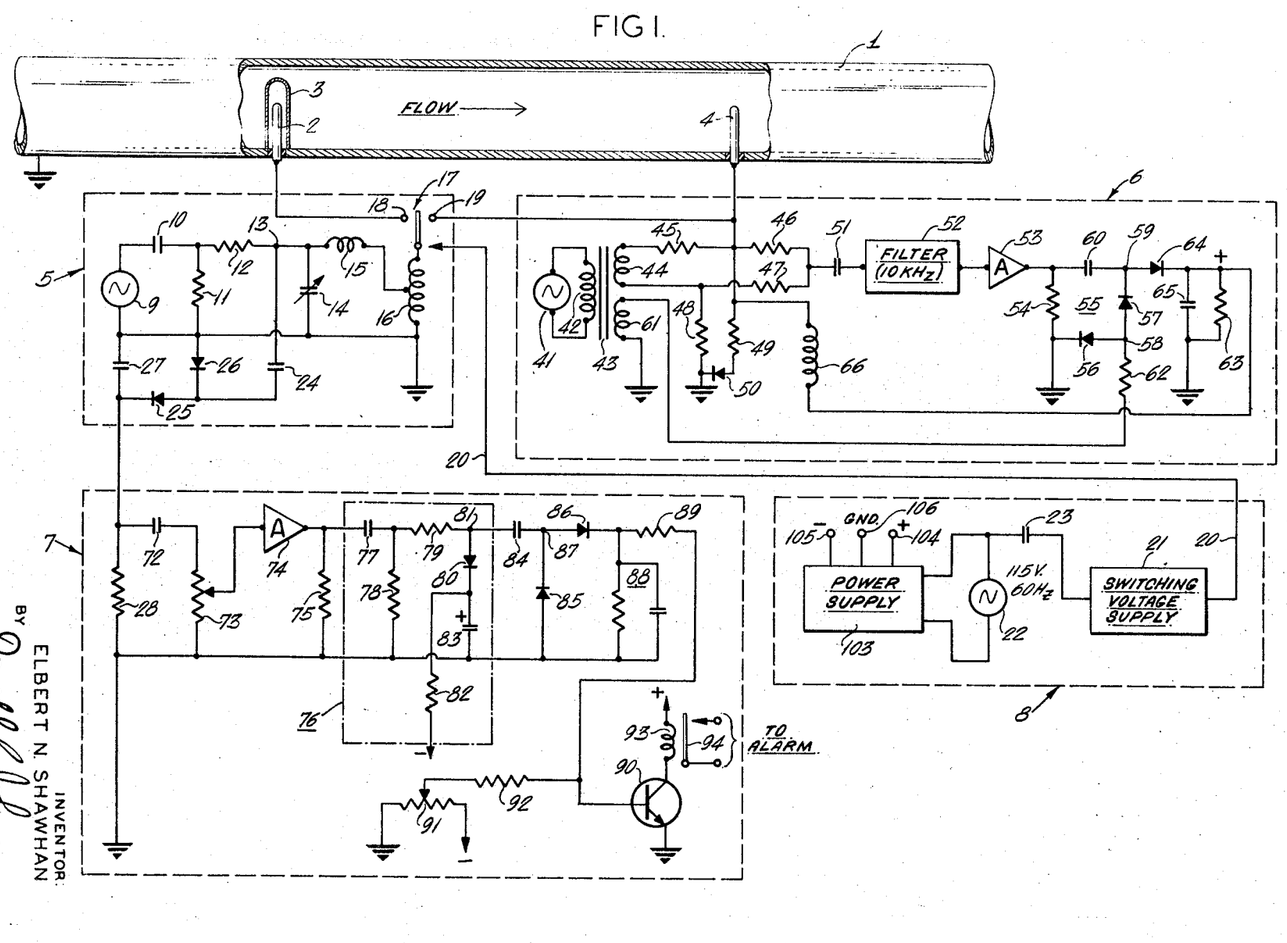
FIG. 1 is a simplified circuit diagram of an analyzer apparatus according to this invention.

First refer to FIG. 1, which is a simplified circuit diagram of the entire stream analyzer apparatus. The stream of oil-in-water emulsion which is being analyzed is flowing in a metallic, grounded pipe 1 in the direction of the arrow indicated by the legend "Flow." For convenience of illustration, this pipe is illustrated in FIG. 1 as being more or less horizontal; however, in some cases this pipe may extend in a vertical direction, the flow then being downward in the pipe. A first metallic capacitive probe 2, which is mounted in but electrically insulated from the wall of the pipe, is the temperature compensating or reference probe. This reference probe is sealed within a capsule 3 (for heat transfer purposes) which is filled with water free from oil. Capsule 3 is metallic, such that it may be considered to be at electrical ground potential; due to the high thermal conductivity of the capsule walls the water inside this capsule is maintained substantially at the temperature of the emulsion stream which flows in pipe 1, around the exterior surface of the capsule. The probe 2 and the capsule 3 may be considered to be the two spaced electrodes of a capacitor. This capacitor uses water free from oil as its dielectric.

A second metallic capacitive probe 4, which is also mounted in but electrically insulated from the wall of the pipe, downstream from probe 2, is the measuring probe, that is, the probe used for measurement of the oil content of the oil-in-water emulsion. As will be disclosed in more detail hereinafter, the probe 4 is concentrically arranged within an apertured metallic electrode serving as the grounded electrode, this outer electrode and the inner electrode 4 then being the two spaced electrodes of a capacitor. The apertured outer electrode allows the stream liquid to enter the measuring probe capacitor, in the manner of a dielectric between the outer electrode and inner electrode 4.

In general, the overall circuit is divided into four sections or modules as indicated by the dotted-line enclosures or blocks 5–8, each such section or module being enclosed in a separate condulet (not shown in FIG. 1). Thus, the block or module 5 comprises a capacitance measuring circuit, the module 6 comprises a water resistance compensation circuit, the section 7 comprises an amplifier and alarm set point circuit, while the block 8 comprises a power and switching voltage supply circuit.

Referring again to the probes, the measuring probe 4 has a capacitance to ground (i.e., to its associated grounded electrode) which depends on the dielectric constant of the liquid (emulsion) flowing past it, the dielectric constant (as previously stated) being a measure of the oil content of this liquid stream. The reference probe 2, in a water-filled capsule 3 at stream temperature, compensates for changes in dielectric constant of the stream due to temperature variations. The effective capacitance of each probe is about 4 pf.

In the capacitance measuring module 5, an oscillator 9, for example of the Colpitts type, generates a stable voltage which is fed through a coupling capacitor 10 and a voltage divider comprising shunt and series resistors 11 and 12, respectively, to a terminal 13 to which a circuit is connected to provide an impedance thereat. The measuring oscillator 9 is operated at the highest practical frequency, to keep the probe impedances low and to minimize the effect of shunting resistance. By way of example, the frequency of oscillator 9 may be 25 mHz.

The circuit connected to terminal 13 is rather similar to that disclosed in my prior Pat. No. 3,073,160, and may include an adjustable capacitor 14 connected from terminal 13 to ground (one output terminal of oscillator 9 being grounded), and an inductance coil 15 and a tapped transformer 16 connected in series across the capacitor 14. One end of the tapped or autotransformer 16 is grounded, and the other end is adapted to be connected by means of a schematically-illustrated switching arrangement 17 (illustrated for convenience as a relay having a pair of fixed contacts 18 and 19, and a movable contact arm connected to the upper end of winding 16) to either the capacitive probe 2 or the capacitive probe 4, alternatively. The contact 18 is electrically connected to the reference probe electrode 2 and the contact 19 is electrically connected to the measuring probe electrode 4.

The switching voltage for operating the movable contact arm back and forth between contacts 18 and 19 is a 60 Hz. square-wave voltage illustrated as being supplied by way of a conductor 20 (in such a way as to act on the movable contact arm of arrangement 17), from a switching voltage supply 21 in the module 8. In this latter module, the switching voltage supply 21 is powered from the 115-volt, 60 Hz. source 22 by a capacitor 23.

Although a mechanical switching arrangement is illustrated at 17, this has been done only for purposes of simplification; as will be hereinafter described, the switching is actually done by means of solid-state devices (diodes) to which is supplied the 60 Hz. square-wave switching voltage. In this connection, it may be noted here that the actual switching arrangement, to be later described, is somewhat similar to that disclosed in my prior Pat. No. 3,390,325. For the present, it will suffice to say that the measuring and reference probes (capacitances) are switched alternatively into the circuit which is connected to terminal 13, at a 60 Hz. rate.

At a critical value of the capacitance C (considering this capacitance to be either that of the reference probe 2, or of the measuring probe 4), the capacitance reflected by the transformer 16 forms a series resonant circuit with the coil 15. The impedance between terminal 13 and ground is then a minimum, and the voltage between this terminal and ground is also a minimum. As C increases, the reflected capacitance between terminal 13 and ground also increases, and the capacitance shunting coil 15 approaches the value for parallel resonance, making the voltage between terminal 13 and ground a maximum. Between these extremes there is a linear relation between C and output voltage. The lower end of the linear range is set by adjusting capacitor 14.

The voltage between terminal 13 and ground is fed through a capacitor 24 to a peak voltmeter arrangement comprising diodes 25 and 26, a capacitor 27, and a resistor 28 (which resistor is in the amplifier and alarm set point module 7). As previously described, the reference capacitor (probe) 2 is switched into the circuit in place of the measuring capacitor (probe) 4 at a 60 Hz. rate. At the terminal 13, there appears a radio frequency wave which comprises the sum of the switching signal wave added to a radio frequency excitation wave (proportional to the capacitance of the probe connected), which latter is generally of different amplitude in the positive and negative half-cycle periods of the switching wave. It may be assumed, for example, that the circuit including the reference probe 2 is switched into the circuit during the positive half-cycles of the switching wave, and, consequently, the radio frequency component of the wave at terminal 13 during the positive half-cycles represents the effect at this terminal of the reference probe 2. Similarly, the amplitude of the radio frequency component during the negative half-cycles of the switching wave corresponds to the effect of the measuring probe 4.

The radio frequency voltage between terminal 13 and ground is rectified by the peak voltmeter arrangement 25–28 to provide across resistor 28 a 60-cycle square wave whose amplitude represents the difference between the capacitances of measuring probe 4 and of reference probe 2. The capacitance of the measuring probe 4 is designed to always be less than that of the reference probe 2. This signal across resistor 28 is the input signal to the amplifier and alarm set point module 7. As previously described, the capsule 3 follows the stream temperature. Since the signal across resistor 28 represents the difference between the capacitances of measuring probe 4 and of reference probe 2, the result is that the measuring circuit indicates the difference between the dielectric constants of the oil-in-water emulsion of the stream and of water in the capsule 3. Thus, the reference probe 2 acts to compensate for changes in the temperature of the emulsion stream. Increased amounts of oil in the emulsion flowing in pipe 1 decrease the capacitance of the measuring probe 4, and cause an increase in the amplitude of the square-wave output from module 5.

Figure 2:
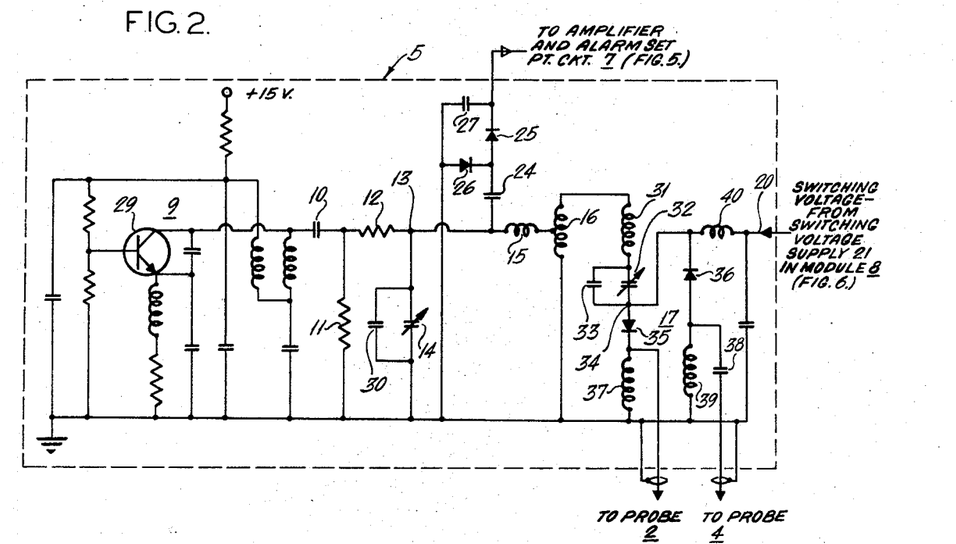
FIG. 2 is a detailed circuit diagram of the capacitance measuring circuit portion of the analyzer apparatus.

FIG. 2 is a detailed or complete circuit diagram of the capacitance measuring circuit 5. The oscillator 9 utilizes an NPN transistor 29 connected in a more or less conventional Colpitts circuit. This oscillator generates a stable 25 mhz. voltage which is applied through the resistor 12 to the terminal 13 of the measuring circuit. The adjustable capacitor 14 for setting the lower end of the operating range is paralleled by a fixed capacitor 30. In the complete circuit of FIG. 2, the linear operating range is extended by the addition of a coil 31 in series with an adjustable capacitor 32 which adjusts the value of C for the upper end of the capacitance range with either probe 2 or probe 4 in the circuit. Capacitor 32 is paralleled by a fixed capacitor 33. A common terminal 34 of capacitors 32 and 33 is opposite to coil 31.

In the actual circuit of FIG. 2, the switching arrangement 17 utilizes a pair of diodes 35 and 36. Between the terminal 34 and ground, a diode 35 is connected in series with two parallel-arranged branches, in one of which there is the capacitance to ground provided by the compensating probe 2 and in the other of which there is a choke 37. Also connected between the terminal 34 and ground is a diode 36 in series with two parallel-arranged branches, in one of which there is the capacitance to ground provided by the measuring probe 4 in series with a fixed capacitor 38 and in the other of which there is a choke 39. It will be noted that diodes 35 and 36 are poled oppositely with respect to each other. The arrangement is such that the capacitances of the probes 2 and 4 are of the same order of magnitude.

A 60 Hz. square-wave switching voltage (derived from the switching voltage supply 21) is fed by way of a choke 40 to the diodes 35 and 36. During the positive half-cycle of the switching voltage diode 35 will be conductive and diode 36 non-conductive. This situation is reversed during the negative half-cycle of the switching voltage. The result, accordingly, is that during one half-cycle of the switching voltage the capacitance provided by the reference or temperature compensating probe 2 will be effectively in the circuit, while the capacitance provided by the measuring probe 4 will be out of the circuit. This condition is reversed during the next succeeding half-cycle of the switching voltage. In effect, this provides a switching action for the capacitances of the reference and measuring probes, whereby these two capacitances are connected alternatively (during successive half-cycles of the switching voltage) into the capacitance measuring circuit 5.

Refer again to FIG. 1. In the water resistance compensation module 6, an oscillator 41, similar in design to the high frequency oscillator 9 but operating at a much lower frequency (for example, 10 kHz.) supplies oscillatory energy to one winding 42 of a toroidal transformer 43. One secondary winding 44 of transformer 43 is connected through a resistor 45 across the input diagonal of a four-arm bridge circuit, so that oscillator 41 excites this bridge circuit. A first arm of the bridge circuit comprises a fixed resistor 46, a second arm comprises a fixed resistor 47, a third arm comprises a reference resistor 48, while the fourth arm comprises the resistance offered by probe electrode 4 (to ground) and in parallel therewith, the series combination of a fixed resistor 49 and the (voltage-variable) resistance of a diode 50. Resistors 46 and 47 are of equal value.

If the equivalent resistance of the probe 4 shunted by the variable resistance of diode 50 (plus of course the fixed resistor 49) exceeds the resistance of the reference resistor 48, a 10 kHz. voltage appears at the output diagonal of the bridge (it may be observed that one bridge output terminal is grounded). This voltage is fed through the coupling capacitor 51 to a 10 kHz. filter 52. This voltage passes through filter 52 and is amplified by an amplifier 53. The amplified 10 kHz. voltage appears across a resistor 54 which is connected between the output of amplifier 53 and ground.

A phase-sensitive detector circuit 55 connected to the output resistor 54 comprises a pair of diodes 56 and 57 having similar electrodes connected to an injection point 58, diode 56 being connected between point 58 and ground, and diode 57 being connected from point 58 to a point 59 which is coupled through a capacitor 60 to the output of amplifier 53 (ungrounded end of resistor 54).

A synchronizing voltage is taken from transformer 43 by means of a secondary winding 61 and is fed through a large resistor 62 to the injection point 58. The phase of this synchronizing voltage is chosen so that diode 56 is conducting during the negative half-cycle of the voltage (10 kHz.) across resistor 54. Capacitor 60 then charges to the peak voltage, which is added to the positive peak voltage on the other half-cycle. Under these conditions, then (resistance of the fourth arm of the bridge greater than that of the third arm), the positive voltage developed across the resistor 63 (one end of which is connected to ground and the other end of which is connected through a diode rectifier 64 to point 59) is the normal output of a peak-to-peak rectifier. A storage capacitor 65 is connected across resistor 63.

If the equivalent resistance of the probe 4 in parallel with the variable resistance of diode 50 (plus the resistor 49), that is, the resistance of the fourth arm of the bridge, is less than the resistance of the reference resistor 48 (the third arm of the bridge), the phase of the output voltage of amplifier 53 is reversed, and diode 56 is nonconducting during the negative half-cycle of the voltage across resistor 54. Capacitor 60 then cannot charge to a negative potential as before, and assumes the peak positive signal potential, which remains constant. The voltage across resistor 63 is then zero.

Summarizing the foregoing, it may be seen that the bridge unbalance detector 55 of the resistance compensation circuit 6 operates as a normal peak-to-peak rectifier for one phase of output from the bridge (i.e., one sense of bridge unbalance), and has zero output for the opposite output phase (i.e., for the opposite sense of bridge unbalance).

The positive resistance control voltage developed across the resistor 63 is applied to the diode 50 by way of an inductance 66 one end of which is connected to the common junction point of the resistor 49 and the lead which extends to probe 4. This resistance control voltage, applied across the diode 50, shifts the operating point on the characteristic curve of FIG. 3 and changes the dynamic resistance of the diode until the bridge unbalance voltage is reduced to a small value. This substantially rebalances the bridge, and in effect maintains the resultant resistance (i.e., the resistance of the voltage variable resistor or diode 50 in parallel with the measuring probe 4) constant, independent of changes in the conductivity of the water in pipe 1. The lower frequency oscillator 41 is thus used to measure the water resistance, and to adjust the resistance of the solid-state resistor 50 to keep the net shunting resistance substantially constant. The high frequency oscillator 9 is used (in module 5) to measure the capacitance of measuring probe 4 with this constant resistance shunt. The calibration against oil content is made with this shunt, and is then unaffected by changes in water conductivity over the range covered by the compensation circuit 6.

In case the resistance of probe 4 is temporarily less than the reference resistance 48, the resistance control voltage across resistor 63 drops to zero (as previously described), and the resistance of diode 50 becomes very high (as represented by the line A in FIG. 3) as compared to the resistance of the probe 4. Normal control is then restored as soon as the probe resistance returns to its usual range. Without the synchronizing voltage (which is applied to detector 55 by way of winding 61 and resistor 62), the detector 55 would not be phase-sensitive, and the resistance control voltage would be such as to cause the resistance of diode 50 to drop to its minimum value, causing the unbalance voltage to increase. In this case, control would not be restored when the probe resistance returned to the normal range. A typical operating resistance for the diode is represented by the line B in FIG. 3.

Figure 3:
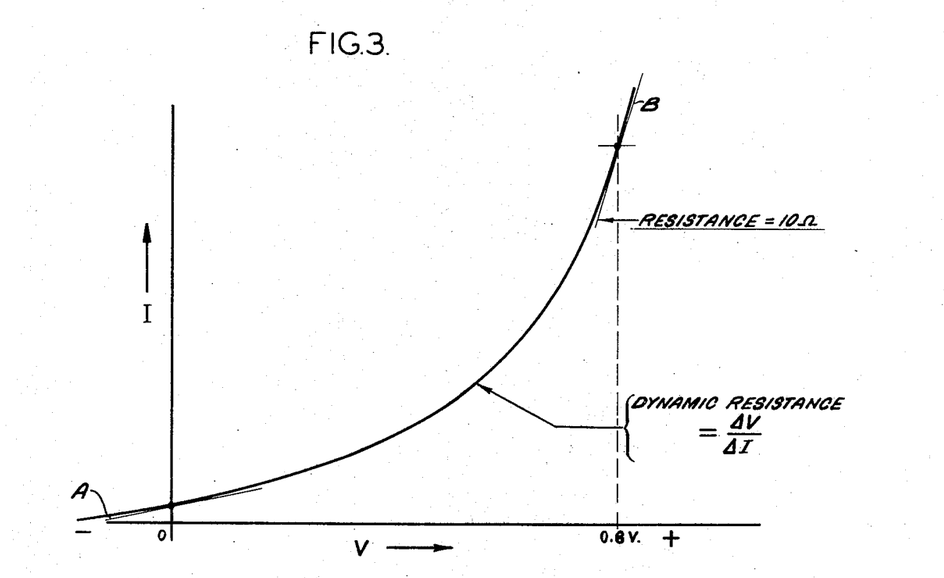
FIG. 3 illustrates the dynamic resistance characteristic of a diode.

Because of the non-linear diode characteristic, which is illustrated in FIG. 3, unwanted harmonics of 10 kHz. are generated and appear in the bridge unbalance output at 51. These harmonics are removed by the 10 kHz. filter 52.

Figure 4:
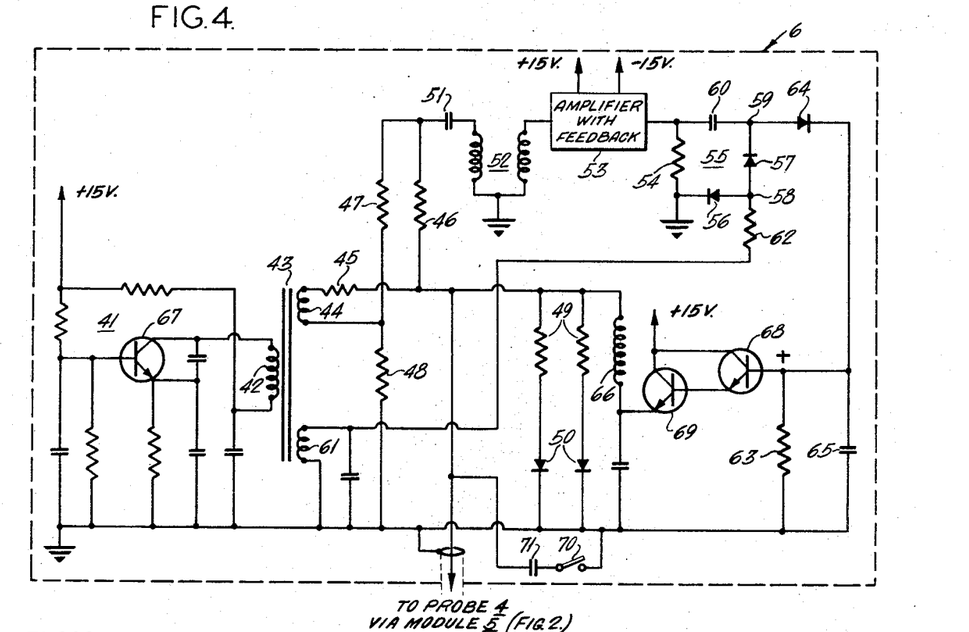
FIG. 4 is a detailed circuit diagram of the water resistance compensation circuit portion of the analyzing apparatus.

FIG. 4 is a detailed or complete circuit diagram of the water resistance compensation circuit 6. The oscillator 41 utilizes an NPN transistor 67 connected in a more or less conventional Colpitts circuit, the winding 42 of the transformer 43 being used as the oscillator tank coil. The secondary winding 44 of transformer 43 excites the four-arm bridge circuit. The secondary winding 61 of transformer 43 supplies (via the resistor 62) the synchronizing voltage to the injection point 58 of the phase-sensitive detector circuit 55.

Between the upper or ungrounded end of resistor 63 and the inductance 66 (through which latter the resistance control voltage is applied to the voltage-variable resistors or diodes 50), there are inserted two compound-connected transistors 68 and 69, of the NPN type. These two transistors act to amplify the resistance control voltage.

Two resistors 49 and two diodes 50 are used to provide the variable resistance element in the bridge circuit, a separate resistor 49 being connected in series with each respective diode 50 and the two series combinations being connected in parallel. Each diode 50 has a shunting capacitance of about one pf. and thus a reactance of more than 10,000 ohms at 25 mHz., the frequency of the oscillator 9 in the capacitance measuring module 5. Since this shunting reactance is large in comparison with the dynamic resistance of the diodes, it has a negligible effect on the total impedance of the diodes. Hence, the value of the variable resistance for balance of the bridge at 10 kHz. (the frequency of oscillator 41) is the correct shunt for the measuring probe 4 to maintain constant resistance at 25 mHz. (the capacitance measuring frequency).

A switch 70 is included in the water resistance compensation module 6 to allow a fixed capacitor 71 to be switched in parallel with the measuring probe 4 to simulate a change in oil content.

Refer again to FIG. 1. As previously stated, the output of the peak voltmeter arrangement 25–28 in the capacitance measuring module 5 (resistor 28 being in the amplifier and alarm set point module 7) is a 60-cycle square wave whose amplitude represents the difference between the capacitances of the measuring probe 4 and of the reference probe 2. This is the input signal to the amplifier and alarm set point module 7. During the time required for reversal of the 60-cycle switching voltage, both probes are connected to the measuring circuit 5 through the varying resistances of the switching diodes 35 and 36 (FIG. 2). Hence, there is a switching spike which would cause an error in the peak-to-peak detector 25–28.

The input signal to module 7, which appears across the resistor 28, is fed through a capacitor 72 to a gain control potentiometer 73, from which a selected portion of the signal is taken off and fed as input to an amplifier 74. The amplified output signal appears across an output resistor 75. This latter signal is applied to the input of a spike clipper or peak clipper circuit 76 enclosed by a dot-dash line.

In the peak clipper circuit the signal is fed through an RC coupling circuit utilizing a series capacitor 77 and a shunt resistor 78 to a resistor 79, and through this latter resistor to a diode 80 which is connected between the point 81 and one end of a resistor 82 the opposite end of which is connected to a fixed negative potential such as 15 volts; point 81 is located at the opposite end of resistor 79 from capacitor 77 and resistor 78. A capacitor 83 is connected from the common junction of diode 80 and resistor 82, to ground. On the positive half of the cycle (of the amplified 60-cycle square wave applied to the input of peak clipper 76), capacitor 83 is charged through diode 80. Absent the resistor 82, capacitor 83 would charge to the peak voltage, and there would be no clipping action. The value of resistor 82 (typically, it may be 220K) is chosen to bleed the charge from capacitor 83 to such an extent that the positive spike is removed, without appreciably altering the positive excursion of the square wave. It may be seen that the positive switching spike is removed or clipped off by the diode 80 which has a self-adjusting bias (provided by capacitor 83 and resistor 82).

The clipped signal output of clipper 76 is fed through a coupling capacitor 84 to a rectifier circuit employing a shunt diode 85 and a series diode 86, which are connected with opposite polarities to a point 87 which is located on the opposite side of capacitor 84 from point 81. The positive voltage which then appears across the rectifier load circuit 88 is applied through a resistor 89 to the base of an NPN transistor 90. Also applied to this same base (by way of a resistor 92) is an adjustable negative voltage obtained from a potentiometer 91 connected between ground and a negative terminal of the power supply. The potentiometer 91 may cover the range from zero to minus 15 volts (D.C.). The output voltage across load circuit 88 may range from +1 to +5 volts. When the net voltage at the junction of resistors 89 and 92 (the base of transistor 90) is positive, this transistor becomes active, energizing the relay coil 93 in series with its collector. The alarm relay 94 then picks up, sounding an alarm. As the slider on potentiometer 91 is moved toward the negative end of this potentiometer, a larger (positive) signal is required to actuate the alarm relay 94. Thus, the transistor 90 compares the rectified signal (across the rectifier load circuit 88) with a preset negative D.C. voltage (obtained from potentiometer 91) which determines the signal level necessary to trip the alarm relay 94; the potentiometer 91 establishes the set point of the alarm.

Figure 5:
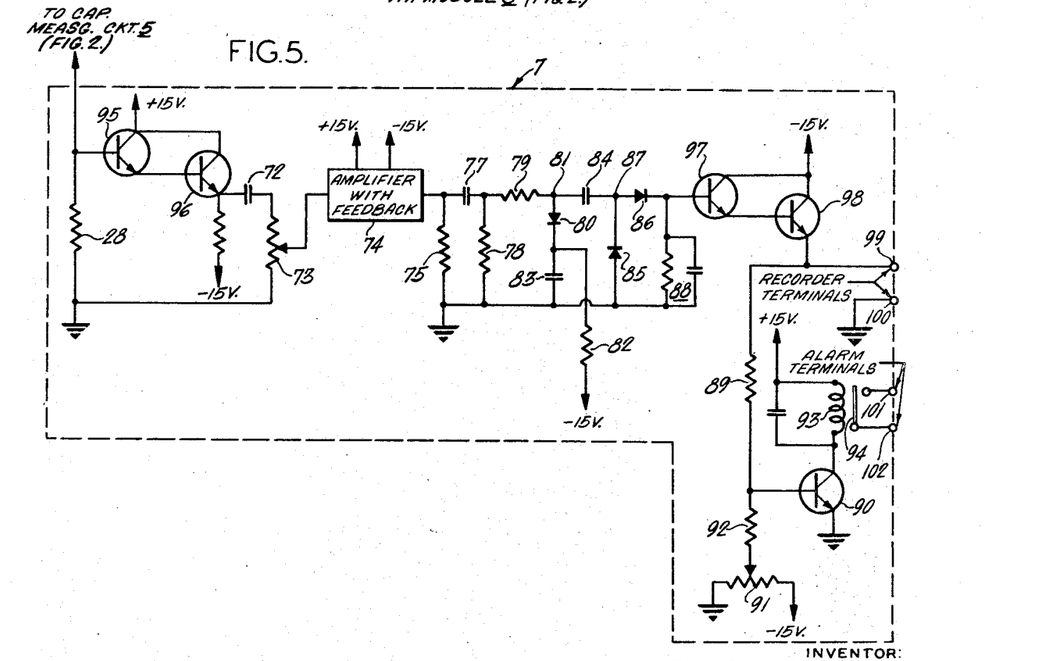
FIG. 5 is a detailed circuit diagram of the amplifier and alarm set point circuit portion of the analyzing apparatus.

FIG. 5 is a detailed or complete circuit diagram of the amplifier and alarm set point module 7. Between the upper or ungrounded end of resistor 28 and the capacitor 72, there are inserted two compound-connected transistors 95 and 96, of the NPN type. These two transistors act to amplify the square-wave output of the capacitance measuring circuit 5.

Between the upper or ungrounded end of the rectifier load circuit 88 and the resistor 89, there are inserted two compound-connected transistors 97 and 98, of the NPN type. These two transistors act to amplify the positive voltage which appears across the rectifier load circuit 88. A positive recorder terminal 99 is connected to the common junction of the resistor 89 and the emitter of transistor 98, the negative recorder terminal 100 being connected to ground. A positive 1–5 volt D.C. signal can appear between terminals 99 and 100. The alarm terminals 101 and 102 are connected to the two contacts of the alarm relay 94.

Refer again to FIG. 1. The power and switching voltage supply module 8 contains a power supply unit 103 (energized from the A.C. power source 22) which provides the positive and negative voltages for the other three modules 5, 6, and 7. Unit 103 provides the positive voltage at a terminal 104, the negative voltage at a terminal 105, and this unit also has a zero voltage or ground terminal 106. The module 8 also contains the switching voltage supply 21 which generates the low impedance switching voltage (60-cycle square wave) for the capacitance measuring module 5.

Figure 6:
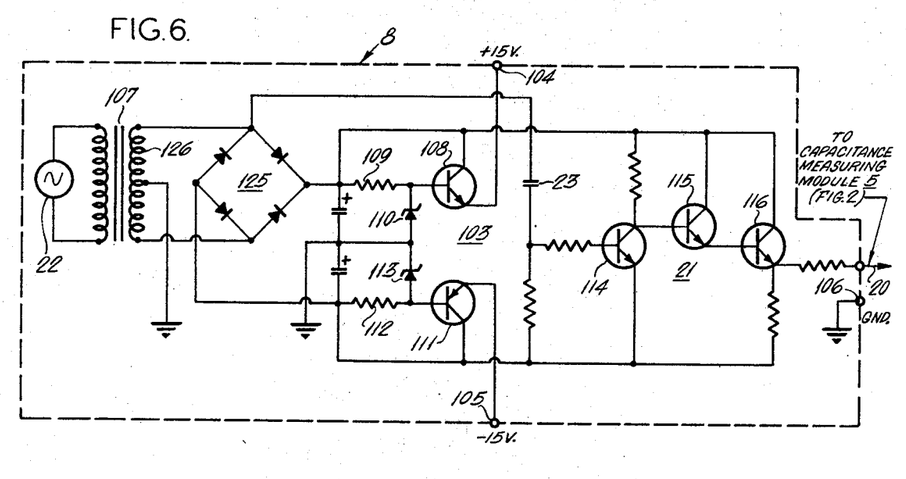
FIG. 6 is a detailed circuit diagram of the power and switching voltage supply circuit portion of the analyzing apparatus.

FIG. 6 is a detailed or complete circuit diagram of the power and switching voltage supply module 8. The power supply 103 is rather conventional, with full-wave rectification for both positive and negative voltages provided by means of a bridge rectifier arrangement 125 supplied from the centertap-grounded secondary winding 126 of a power transformer 107 whose primary winding is supplied from the 115-volt A.C. source 22. An NPN transistor 108, together with a resistor 109, provides series regulation for the positive voltage (15 volts) which is supplied to output terminal 104; a 15-volt Zener diode 110 assists in the regulation of this positive voltage. A PNP transistor 111, together with a resistor 112, provides series regulation for the negative voltage (15 volts) which is supplied to output terminal 105; a 15-volt Zener diode 113 assists in the regulation of this negative voltage.

In the switching voltage supply 21, 60 Hz. alternating current from winding 126 is fed through capacitor 23 to the base of an NPN transistor 114 connected as an amplifier stage. The output of this latter stage drives a pair of NPN transistors 115 and 116 connected as cascaded emitter followers, in order to generate the 60 Hz. square-wave switching voltage; this switching voltage is fed from the emitter of transistor 116, by means of lead 20, to the capacitance measuring module 5, for use therein. This low impedance switching voltage provides the current of about 20 ma. which is necessary for complete switching of the two probes 2 and 4.

The analyzing apparatus of the invention is designed to cover a span of 0 to 10% oil in water, corresponding to a capacitance change (of the measuring probe 4) of about 42 pf. In operation, increased amounts of oil (in the oil-in-water emulsion flowing in pipe 1) decrease the capacitance of measuring probe 4 and cause an increase in the output D.C. voltage (across rectifier load circuit 88). The alarm relay 94 is wired so that a contact is closed (thereby to complete a circuit between alarm terminals 101 and 102, FIG. 5) when the oil content of the stream exceeds the set point (as established by the slider on potentiometer 91).

Figure 7:
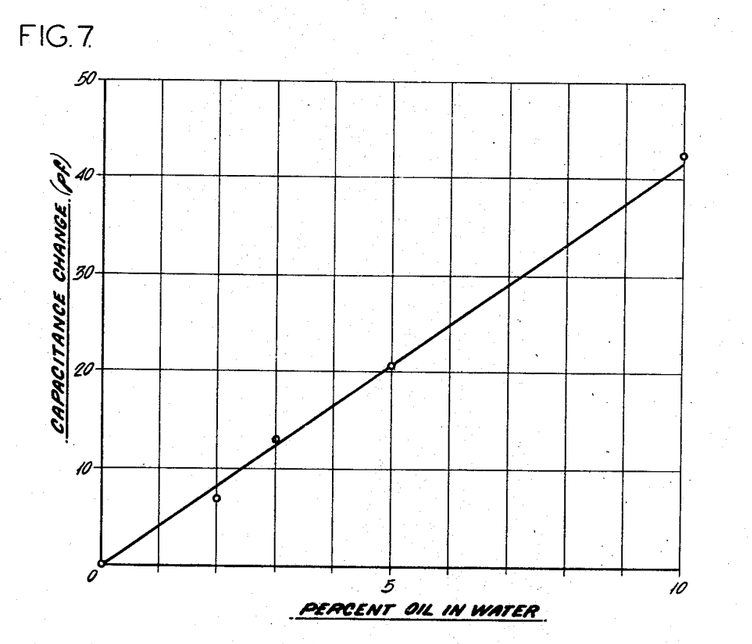
FIG. 7 is a typical calibration curve for the analyzing apparatus of the invention.

A typical calibration curve for the analyzing apparatus of the invention, wherein percent oil in water is plotted against capacitance change of the measuring probe 4 (in pf.), is illustrated in FIG. 7. It may be noted that at the measuring frequency used the capacitance change is nearly linear with oil content.

Figure 8:
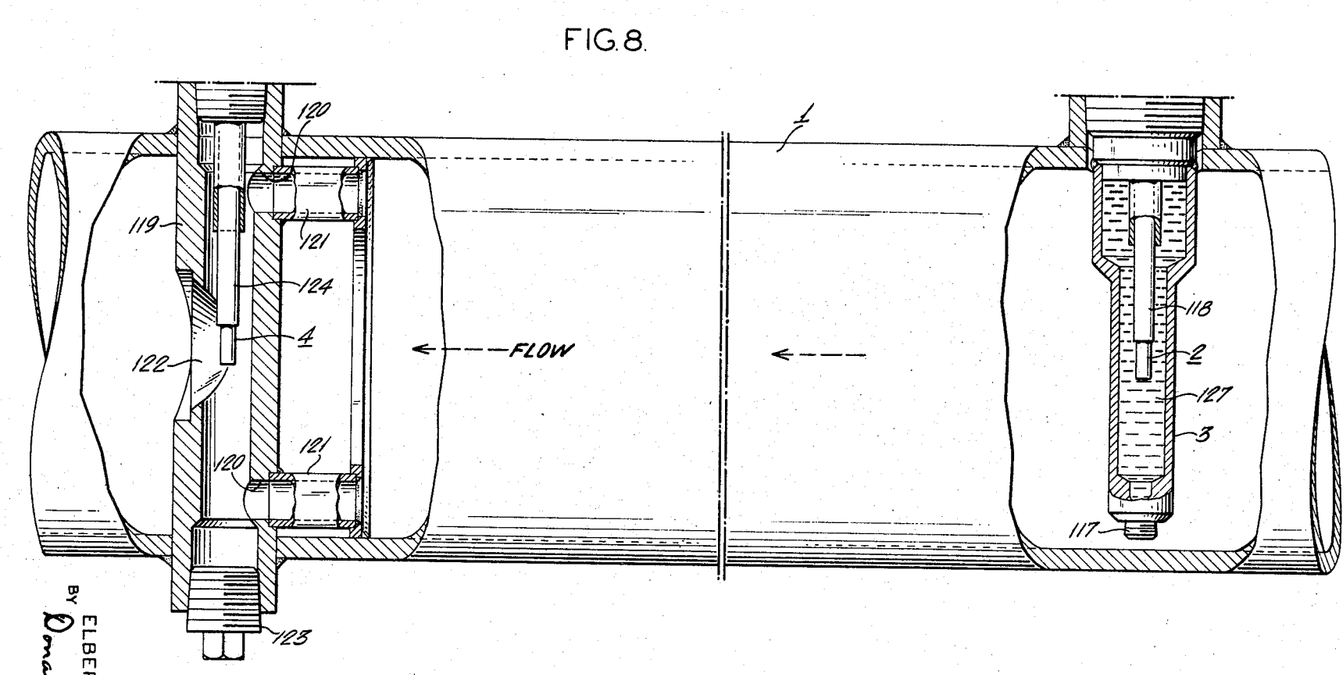
FIG. 8 is an elevational view, partly in section, illustrating a pair of probes mounted in a pipe.

Refer now to FIG. 8, which illustrates structural details of the two probes 2 and 4, and the manner of mounting the same in pipe 1.

The pipe section 1, wherein the probes 2 and 4 are mounted, is coupled into a pipe line (wherein the oil-in-water emulsion to be analyzed is flowing) by means of suitable flanges (not shown) at the two ends of this pipe section. The stream flow is in the direction indicated by the arrow labeled "Flow." The pipe section 1, which may be thought of as a probe housing, has a larger diameter than the pipe line into which it is inserted, in order to avoid pressure drop where the stream passes the probes.

The reference or temperature compensating probe 2 (located upstream from the measuring probe 4) is insulatingly mounted within a sealed metallic capsule 3 the outer end of which is sealed through the wall of the pipe or housing 1 (as by the threaded coupling illustrated) and extends into the interior thereof, in a direction at right angles to the longitudinal axis of such housing. The capsule 3 is metallically connected to the wall of pipe 1, and is thus at ground potential. The emulsion stream flows around the outside of capsule 3 in direct contact with this capsule, so that the capsule is brought to the temperature of the flowing stream. A threaded pipe plug 117 is provided in the inner end of capsule 3, to enable the interior of such capsule to be filled with water 127 which is free from oil, the pipe plug then sealing the capsule interior off from the interior of housing 1. It may be noted here that the interior of capsule 3 is entirely sealed off from the interior of housing 1.

The reference probe 2 is mounted concentrically within capsule 3, but spaced from the inner wall thereof, so that the annular space between this probe and the inner wall of the capsule contains the oil-free water 127. The major portion of the length of the metallic probe 2 is covered with a sleeve 118 of electrical insulating material, but the inner end thereof (for a short length, in the region of the axis of pipe 1) is left bare.

The outer end (not shown) of the probe assembly 2, 3 is threaded into a fitting provided on a Condulet (not shown), so that an electrical connection (this would be a connection to the common junction of choke 37 and switching diode 35, FIG. 2) can be made to the probe 2.

The measuring probe 4 is insulatingly mounted within an apertured hollow metallic cylinder 119 which is sealed as by welding through the wall of pipe or housing 1, and extends diametrically through pipe 1, at right angles to the longitudinal axis of the pipe. Since cylinder 119 is metallically connected to pipe 1, it is at ground potential, and serves as an outer electrode for the measuring probe.

A pair of diametrically-opposite entrance apertures 120 are provided in cylinder 119, on the upstream side of this cylinder, these apertures being located near the inner wall of pipe 1. A short sleeve 121, which extends upstream from cylinder 119 and parallel to the axis of pipe 1, is secured in each respective one of the apertures 120. A centrally-located exit aperture 122, the diameter of which is greater than the diameter of either aperture 120, is provided in cylinder 119, on the downstream side of this cylinder. It should be apparent that a portion of the emulsion stream flowing in pipe 1 will flow through the entrance apertures 120 into the interior of cylinder 119, and thence out of cylinder 119 by way of the exit aperture 122. Thus, a sample of the liquid stream flowing in pipe 1 is received between electrodes 119 and 4 (electrode 4 being mounted within cylinder 119) in the manner of a dielectric.

If the pipe 1 extends vertically (in which case the liquid flow may be downward in this pipe), a funnel-like arrangement or catcher (not shown) may be provided within this pipe, adjacent cylinder 119, to collect liquid and maintain liquid coverage over the probe 4 (within cylinder 119), in case the pipe is not running full.

A threaded pipe plug 123 is provided at one end of cylinder 119, to enable the interior of cylinder 119 to be drained when necessary.

The measuring probe assembly is mounted concentrically within cylinder 119, but spaced from the inner wall thereof, by means of the threaded coupling illustrated at the end of cylinder 119 opposite to plug 123. The annular space between the probe 4 itself and the inner wall of cylinder 119 then receives a sample of the liquid flowing in pipe 1. The major portion of the length of the metallic probe 4 is covered with a sleeve 124 of electrical insulating material, but the inner end thereof (for a short length, in the region of the axis of pipe 1) is left bare.

The outer end of the measuring probe assembly (probe 4 plus its threaded mounting means by means of which it is mounted within cylinder 119) is threaded into a fitting provided on a condulet (not shown), so that an electrical connection (this would be a connection to the common junction of choke 39 and switching diode 36, FIG. 2, and capacitor 71 and resistors 45, 46, and 49, FIG. 4) can be made to the probe 4.

The invention claimed is:

1. Apparatus for measurement of the dielectric constant of a liquid mixture which includes as a major component a conducting liquid whose conductivity may change in an unpredictable manner, comprising a capacitive probe having a pair of spaced electrodes arranged to receive said liquid mixture therebetween in the manner of a dielectric, said probe inherently having a finite interelectrode resistance due to the presence of said conducing liquid between said electrodes; a voltage-variable resistor connected in parallel with the electrodes of said probe through couplings capable of passing direct current to form a parallel combination of the resistance of said resistor and the interelectrode resistance of said probe, means including a source of electrical potential coupled to said parallel combination for sensing any variation from a predetermined value in the resistance of said parallel combination and for producing a control voltage in response to such variations, means for applying said control voltage to said resistor to vary the resistance thereof to substantially reestablish said predetermined value, and means for measuring the capacitance provided between said pair of electrodes in the presence of said liquid mixture.

2. Apparatus in accordance with claim 1, wherein said liquid mixture is flowing in a conduit, and wherein said probe is mounted in said conduit in such a way that said mixture flows through the space between said pair of electrodes.

3. Apparatus of claim 1, characterized in that said sensing and producing means comprises a four-arm bridge one arm of which is constituted by said parallel combination, said source feeding oscillatory energy to one diagonal of said bridge, and bridge unbalance detecting means coupled to the other diagonal of said bridge.

4. Apparatus as defined in claim 1, wherein said voltage-variable resistor comprises a diode having a nonlinear voltage-vs.-current characteristic.

5. Apparatus in accordance with claim 1, wherein said voltage-variable resistor comprises a diode having a nonlinear voltage-vs.-current characteristic, and wherein said sensing and producing means comprises a four-arm bridge one arm of which is constituted by said parallel combination, said source feeding oscillatory energy to one diagonal of said bridge, and bridge unbalance detecting means coupled to the other diagonal of said bridge; the produced voltage being applied to said diode to vary the effective resistance thereof.

6. Apparatus for measurement of the dielectric constant of a liquid mixture which includes as a major component a conducting liquid whose conductivity may change in an unpredictable manner, comprising a capacitive probe having a pair of spaced electrodes arranged to receive said liquid mixture therebetween in the manner of a dielectric, said probe inherently having a finite interelectrode resistance due to the presence of said conducting liquid between said electrodes; a voltage-variable resistor connected in parallel with the electrodes of said probe to form a parallel combination of the resistance of said resistor and the interelectrode resistance of said probe, means including a source of electrical potential coupled to said parallel combination for sensing any variation from a predetermined value in the resistance of said parallel combination and for producing a control voltage in response to such variation, means for applying said control voltage to said resistor to vary the resistance thereof to substantially restablish said predetermined value, a terminal, a circuit connected to said terminal to provide an impedance thereat, means for switching alternately into said circuit a first capacitance provided by said probe and a second capacitance provided by a pair of spaced electrodes having only said major component between them but maintained at the temperature of said mixture, means separate from said potential source for supplying oscillations to said terminal, means for developing a first voltage proportional to said first capacitance, means for developing a second voltage proportional to said second capacitance, and means for measuring the difference between said first and second voltages.

7. Apparatus in accordance with claim 6, wherein said liquid mixture is flowing in a conduit, wherein the electrodes of said first capacitance are mounted in said conduit in such a way that said mixture flows through the space between such electrodes, and wherein said second capacitance is mounted as a unit in said conduit but the interelectrode space thereof is sealed off from said conduit.

8. Apparatus of claim 6, characterized in that said sensing and producing means comprises a four-arm bridge one arm of which is constituted by said parallel combination, said source feeding oscillatory energy to one diagonal of said bridge, and bridge unbalance detecting means coupled to the other diagonal of said bridge.

9. Apparatus as defined in claim 6, wherein said voltage-variable resistor comprises a diode having a nonlinear voltage-vs.-current characteristic.

10. Apparatus for measurement of the dielectric constant of a liquid mixture which includes as a major component a conducting liquid whose conductivity may change in an unpredictable manner, comprising a capacitive probe having a pair of spaced electrodes arranged to receive said liquid mixture therebetween in the manner of a dielectric, said probe inherently having a finite interelectrode resistance due to the presence of said conducting liquid between said electrodes; a voltage-variable resistor connected in parallel with the electrodes of said probe to form a parallel combination of the resistance of said resistor and the interelectrode resistance of said probe, a four-arm bridge one arm of which is constituted by said parallel combination, means feeding oscillatory energy to one diagonal of said bridge, bridge unbalance detecting means coupled to the other diagonal of said bridge for producing a control voltage in response to any variation from a predetermined value in the resistance of said parallel combination, means for applying said control voltage to said resistor to vary the resistance thereof to substantially reestablish said predetermined value, a terminal, a circuit connected to said terminal to provide an impedance thereat, means for switching alternately into said circuit a first capacitance provided by said probe and a second capacitance provided by a pair of spaced electrodes having only said major component between them but maintained at the temperature of said mixture, means separate from said oscillatory energy feeding means and of a frequency high compared to the frequency of such feeding means for supplying oscillations to said terminal, means for developing a first voltage proportional to said first capacitance, means for developing a second voltage proportional to said second capacitance, and means for measuring the difference between said first and second voltages.

11. Apparatus for measurement of the dielectric constant of a liquid mixture which includes as a major component a conducting liquid whose conductivity may change in an unpredictable manner, comprising a capacitive probe having a pair of spaced electrodes arranged to receive said liquid mixture therebetween in the manner of a dielectric, said probe inherently having a finite interelectrode resistance due to the presence of said conducting liquid between said electrodes; a diode having a nonlinear voltage-vs.-current characteristic connected in parallel with the electrodes of said probe to form a parallel combination of the resistance of said diode and the interelectrode resistance of said probe, a four-arm bridge one arm of which is constituted by said parallel combination, means feeding oscillatory energy to one diagonal of said bridge, bridge unbalance detecting means coupled to the other diagonal of said bridge for producing a control voltage in response to any variation from a predetermined value in the resistance of said parallel combination, means for applying said control voltage to said diode to vary the effective resistance thereof to substantially reestablish said predetermined value, a terminal, a circuit connected to said terminal to provide an impedance thereat, means for switching alternately into said circuit a first capacitance provided by said probe and a second capacitance provided by a pair of spaced electrodes having only said major component between them but maintained at the temperature of said mixture, means separate from said oscillatory energy feeding means and of a frequency high compared to the frequency of such feeding means for supplying oscillations to said terminal, means for developing a first voltage proportional to said first capacitance, means for developing a second voltage proportional to said second capacitance, and means for measuring the difference between said first and second voltages.

References Cited

UNITED STATES PATENTS

| 2,330,394 | 9/1943 | Stuart. | |
| 3,177,427 | 4/1965 | Kuntz et al. | 324—61 |
| 3,286,171 | 11/1966 | Fluegel et al. | 324—60 |
| 3,390,325 | 6/1968 | Shawhan | 324—60 |

EDWARD E. KUBASIEWICZ, Primary Examiner

U.S. Cl. X.R.

324—30